(12) United States Patent
Green

(10) Patent No.: US 9,866,518 B1
(45) Date of Patent: Jan. 9, 2018

(54) INTRODUCTION AND COMMUNICATION SYSTEM

(71) Applicant: Andrew Green, New York, NY (US)

(72) Inventor: Andrew Green, New York, NY (US)

(*) Notice: Subject to any disclaimer, the term of this patent is extended or adjusted under 35 U.S.C. 154(b) by 113 days.

(21) Appl. No.: 15/144,374

(22) Filed: May 2, 2016

Related U.S. Application Data

(60) Provisional application No. 62/154,836, filed on Apr. 30, 2015.

(51) Int. Cl.
 *G06F 15/16* (2006.01)
 *H04L 12/58* (2006.01)
 *H04L 29/12* (2006.01)

(52) U.S. Cl.
 CPC ............ *H04L 51/36* (2013.01); *H04L 51/046* (2013.01); *H04L 51/32* (2013.01); *H04L 61/1594* (2013.01)

(58) Field of Classification Search
 USPC .................................. 709/206, 220; 705/319
 See application file for complete search history.

(56) References Cited

U.S. PATENT DOCUMENTS

| | | | |
|---|---|---|---|
| 6,178,346 B1* | 1/2001 | Amundson | A61B 5/0086 348/77 |
| 6,743,248 B2* | 6/2004 | Edwards | A61B 17/00491 606/214 |
| 2009/0018851 A1* | 1/2009 | Greenfield | G06Q 10/10 705/319 |
| 2011/0301670 A1* | 12/2011 | Gross | A61N 1/36071 607/62 |
| 2016/0015253 A1* | 1/2016 | Roop | A61B 17/1285 600/106 |

* cited by examiner

*Primary Examiner* — Tammy Nguyen
(74) *Attorney, Agent, or Firm* — Goldberg Cohen LLP

(57) ABSTRACT

A communication system to facilitate introduction and communication of two of the user's acquaintances, regardless of which contact information the user has on file for each individual. The system improves upon the current existing forms of contact lists and communication which require an individual to introduce people either in person or through one consistent form of media which both acquaintances must have. The application itself is also able to format the messages and covert them so that each individual receives the message in the form that they prefer to be contacted. Likewise, the two individuals can continue to communicate with each other using the introducer's original chain without having to download the application themselves.

1 Claim, 7 Drawing Sheets

INTRODUCTION AND COMMUNICATION SYSTEM

CROSS-REFERENCE TO RELATED APPLICATION

This Non-Provisional Utility application claims the benefit of U.S. Provisional Patent Application Ser. No. 62/154,836, filed on Apr. 30, 2015, which is incorporated herein in its entirety.

BACKGROUND OF THE INVENTION

Often, a person wants to introduce certain people to each other, but there is no convenient way to do it. In the past, people used to keep a traditional address book on paper to store the contact information of their acquaintances. Now, a person's contacts are generally spread over a plethora of different social networks and different forms of electronic contact information. Especially in the modern age of computing and networking, people meet others on a daily basis for the purpose of business, socializing, and forth through many forms of electronic and in person means. As a result, contact information gets spread over a variety of different forms of sites and means of communication. Moreover, it is difficult to merge a person's contacts from the various social media sites, such as, LinkedIn, Facebook, Twitter, Google Plus, phone contacts, Outlook or other email contacts (and any further types of social media sites or types of contact information).

It has always been important for people to be make introductions to others. For professionals, word of mouth referrals have frequently been a key means of gaining new clients or customers. Likewise, people often make business connections between various friends or acquaintances that might gain value by being put into contact with each other. Further, people often want to introduce two of their friends or acquaintances for the purpose of dating.

Today, if a person wants to provide a referral, or to introduce two people, it is difficult to even pull up a database which has a complete list of that person's acquaintances. People often have so many contacts that they do not remember them all until they scroll through a list and get reminded. For example, if individuals want to introduce two of their friends for the purpose of dating, they might want to scroll through their list of contacts to get ideas of who might be a good fit to recommend.

Another complication of existing technology is that an individual often has only certain contact information of each acquaintance. For example, an individual might have one friend's email address only and another friend's telephone number only. Alternatively, an individual might have one friend's LinkedIn account but not his email address or telephone number.

Therefore, it can be difficult to introduce two people with today's numerous forms of social media and contact management systems. An individual's contact list is often scattered across a wide variety of social media networks and types of contacts (phone and/or email and/or fax, etc.), in no consistent fashion.

Accordingly, the present invention provides a solution for the problems and shortcomings of the currently existing technology. The system in the present invention enables individuals to have a special software application to facilitate the introduction of any two individuals in their networks. The system both facilitates introductions and facilitates follow up communication thereafter between the two people being introduced. In accordance with the invention, an individual can access any person from any one of the individual's contact lists and sites, and can introduce that person to a second person from any one of the individual's contact lists and sites. The two individuals being introduced are then able to communicate with each other, even without being a member of the same social site or having the other's contact information. This improves the existing methods of linking individuals.

The software application has an added feature of a converter which allows communications even when the two people being introduced have unmatched formats. For example, an introducing individual can allow one of the people being introduced to communicate via text messages, and the other via emails, with the introducing individual's system (or an application or website) transmitting the text messages of one person to emails of the second, and vice versa, the emails of the second to text messages to the first. Therefore, different modes of communication are converted so that people having different means of communication, or in different social networks, are able to communicate once introduced by a user of this system.

SUMMARY OF THE INVENTION

In accordance with the invention, a system for electronic communication is provided which can be used on or between any two communicating electronic devices of any category or subcategory, whether computers, tablets, cell phones, smart phones, and so forth.

In one embodiment of the invention, a method of electronic communication is provided between disparate receiving formats; whereby a person can send a text message from his/her phone to another person who receives it as an email message, and whereby a person can send an email message to another person who receives it as a text message.

In a further alternate or additional embodiment, a method of introduction and communication is provided, whereby a person can introduce two acquaintances to each other where the person making the introduction has only the phone number of one acquaintance and only the email address of the other acquaintance. In a further alternate or additional embodiment, the two people introduced can continue communicating to each other without either party having the contact information of the other, i.e. with the stream of communication in both directions going through the introducer's system or web site.

In a further alternate or additional embodiment, a method of communication is provided whereby people can communicate through a system or website without the need to newly join or sign up to the system or website, create an account on the website, log in to the website, or installing an app for the website. In this embodiment, all communications proceed through the users existing communication channels with an introducer who they each already know.

In a further alternate or additional embodiment of the invention, a method is provided whereby a user can electronically introduce two people to each other when one is in one of the user's multiple contact lists and the other person is in another one of his or her contact lists, including but not limited to, the user's LinkedIn, FaceBook, phone contacts, Outlook, Google Plus contact lists, or so forth.

In a further alternate or additional embodiment of the invention, a system is provided for introducing two people to each other on a website or application with three taps (Tap 1—"Contacts A"; Tap 2—"Contact B"; and Tap 3—"Introduce").

In yet another embodiment, a method for electronically introducing a first individual to a second individual by an introducer includes installing an introduction application on an electronic device of the introducer having a central processor, memory, and at least two modes of electronic communication and executing the introduction application. At least one contact list is resident on the introducer's electronic device is accessed. A first individual is selected from a first accessed contact list and the first individual's mode of communication is determined. A second individual is selected from a second accessed contact list and the second individual's mode of communication is determined. An introduction command is executed on the introducer's electronic device wherein a chat invitation is sent to the first individual via the determined mode of communication for the first individual, and a chat invitation is sent to the second individual via the determined mode of communication for the second individual. Acceptance of the chat invitation by the first individual and acceptance of the chat invitation by the second individual are monitored. The chat messages between the first individual and the second individual are converted to the respective modes of communication. The converted messages are relayed between the first and the second individuals.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
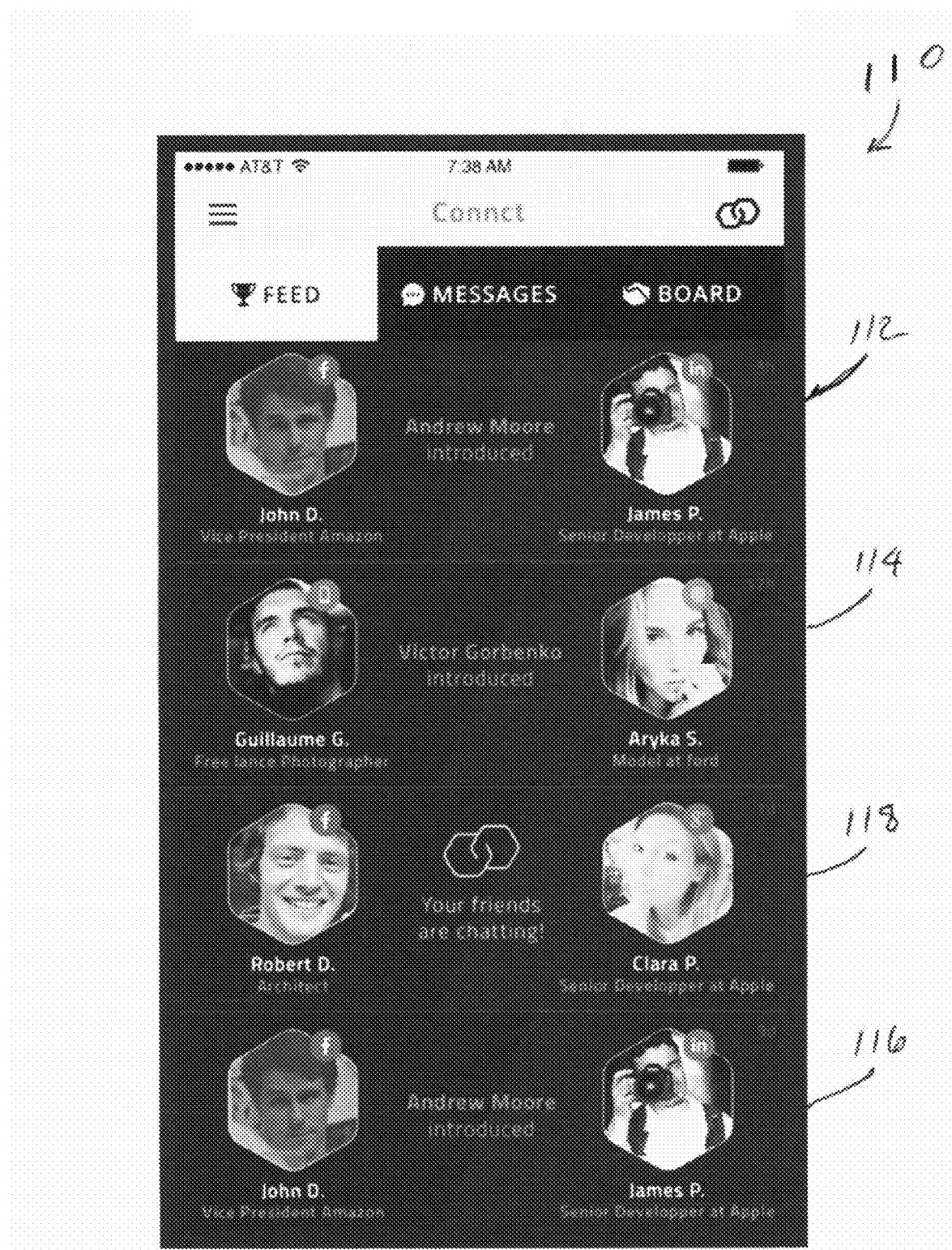
FIG. 1 presents a view of a first screen shot of an application embodying the present invention, wherein acquaintances have been introduced.

The invention relates to the field of social media, mobile software applications, and communication between different acquaintances of an individual. In this mode of electronic communication, a person can introduce two of his acquaintances to each other regardless of what contact information he has for each of them. The introducer can send a communication from his or her phone to each of the individuals being introduced, and each of those individuals will get a message in the form of an email, a text message, or another type of message depending on the contact information on file for that particular individual. For example, the introducing person Ike, can make an introduction between Allie and Bobby, which contacts Allie by text message, and Bobby by email.

Moreover, the means of introducing them is made seamless. In a preferred embodiment, introductions are made with a "three (3) tap" or "three (3) click" system. In other words, the introducer taps or clicks on contact A, then the introducer taps or clicks on contact B, and then taps or clicks on "introduce". In this simple effective manner, the two individuals are thereby connected by the introducer.

Thereafter, the two people introduced can continue communicating to each other without either party having the email address or phone number of the other. If they want, they can simply continue to communicate using the original communication received from the introducer, with the subsequent communications going through the introducer's system. Thus, the two people being introduced do not necessarily have to install the application, open an account, or log in, in order to be able to communicate and be part of the conversation string. This facilitates follow-up communication, and in some cases preserves privacy of the person's contact information in the initial stages of communication (whether in the case of dating or otherwise). Also, sometimes when an introducer wants to connect two individuals, the two parties being introduced do not know who should reach out first or how to initiate the original "meeting." With the present application, that awkward initial step is removed as the introducer begins the flow of communication for the two people being introduced.

Furthermore, unlike the existing technology, the present inventions provide a user with the ability to electronically introduce two people to each other when the first person is in one of his or her contact lists and the second person is in another. Thus, between LinkedIn, Facebook, Twitter, Google Plus, phone contacts, Outlook or other email contacts (and any further types of social media sites or types of contact information), the two people being introduced can be on different sites yet put in contact. Thus, as an example, one can be on LinkedIn and the other on Facebook, and the introducer can connect them.

This is a helpful means of to introducing people for a variety of reasons. It is a particularly effective means of making connections between business people for business purposes, and for an individual to refer a friend to a recommended professional in one of the individual's networks. Likewise, this is useful for dating, to introduce two people so they can be in contact and get to know each other better. This application has unlimited uses as there are a multitude of reasons a person might want to make a connection between two other people that he or she knows.

In one embodiment of the invention, the two individuals being contacted can communicate through the introducer's system. In an alternate or additional embodiment of the invention, after two individuals are introduced, one or both can install an application or join a website which implements the features of the invention. As a result, one feature of the present invention is that the people being introduced can, at any time, select to receive and send their messages on the application in the format that he or she wants, such as email format or text format, and can change that format at any time. In other words, each recipient can set his or her particular preferences. Then if Allie selects the email format, any messages sent to Allie by Bobby in another format (e.g. in text message format from Bobby), will be converted to email and then sent in email format to Allie. When Allie responds in email, the application's server converts it to text message and sends it as a text message to Bobby. Likewise, the process is reversed when the other party sends an email to the user who elected to receive and send messages by text.

Another feature of the present invention is that it can operate even if only one party to the introduction has the application installed (or joins the website) and the other party does not. In that case, only the party with the application installed can elect to receive and send messages in email format or text format. The second party will continue to receive messages in the format they were originally contacted in by the introducer.

Similarly, in those cases where the recipient installs the application, the recipient of an introduction can select the format or message receipt at any time or can select specified times when messages are received in one format or the other, with the ability to override at any time. In one such embodiment, in those cases where a user sends an email message which gets converted to a text message, the cost of sending the text message would be billed to the application's server sending the text and the charge would need to be billed back to the user even though the user sent an email. Similarly, if the third party sends the user an email message which is converted to a text message, the cost of the text billed to the application's server would be billed to the user. Alternatively, the application's server can send texts using the "What's App" system so that they can be sent virtually for free.

An additional feature for the present invention is that the person making the introduction is advised when the people who are being introduced both accept the invitation and send their first messages. The introducer therefore knows that the connection was made successfully and that his or her job is done.

Accordingly, this invention solves many of the shortcomings of the current existing techniques of introduction and communication. Additionally, this invention does not require all of the contacts to be part of the application or members of the applications in order to work. As long as the user can receive a communication from the introducer, the application enables the two individuals being introduced to continue communicating with each other. Likewise, if either or both of the recipients choose to install the application, they can engage in communication through the system as well, and set their preferences, such as preferences as to communication format.

Figure 5:
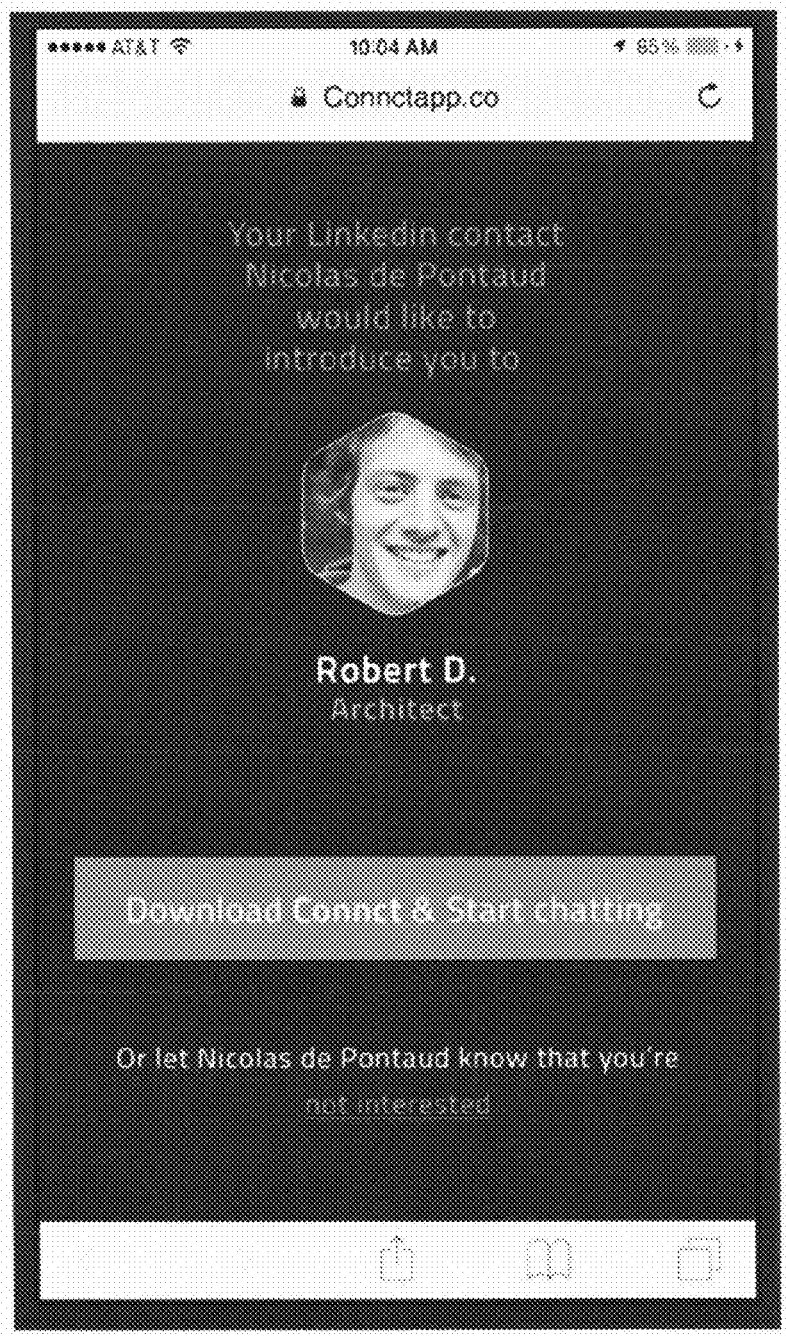
FIG. 5 presents a view of a fifth screen shot of the application showing an invitation to a second of the individuals being introduced to begin chatting.
Figure 6:
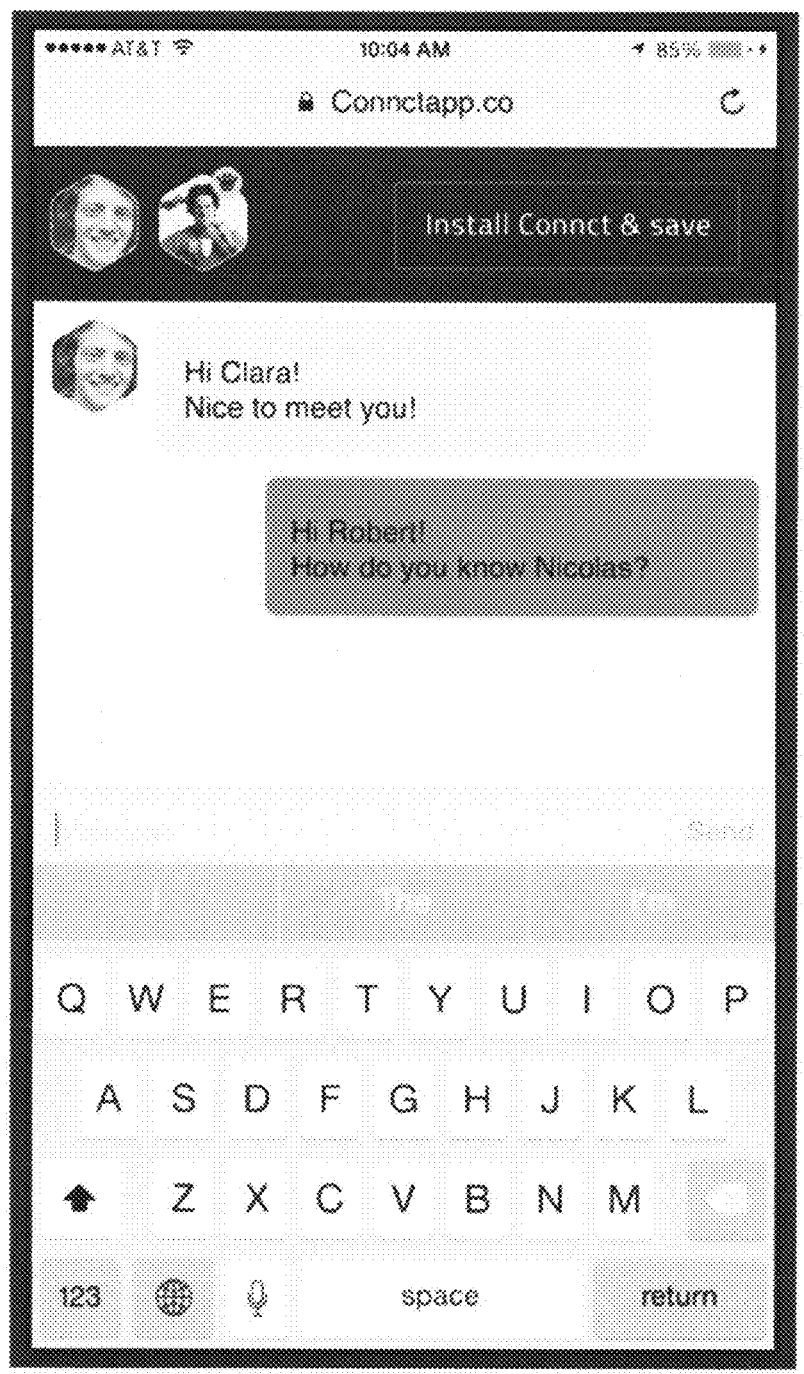
FIG. 6 presents a view of a sixth screen shot of the application showing the two invitees chatting one with the other.
Figure 7:
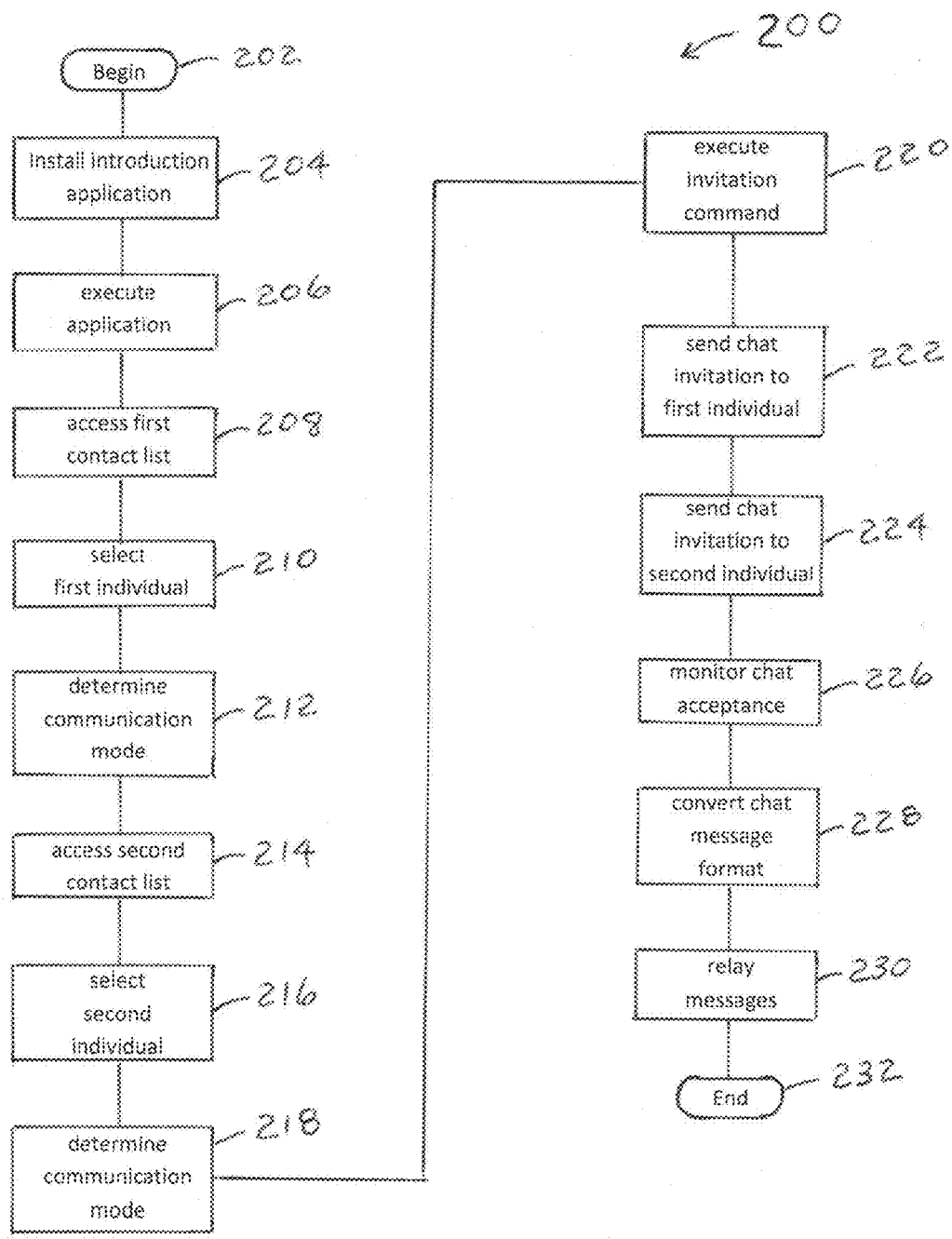
FIG. 7 presents a process flow chart of the introduction application in use.

An example of an embodiment of an introduction application as described is illustrated in FIGS. 1-7 wherein FIGS. 1-6 represent exemplary screen shots of implementation of the introduction application on a smart phone possessed by an introducer and FIG. 7 illustrates an exemplary process flow diagram 200 of the use of the introduction application. Referring primarily to the process flow diagram 200 of FIG. 7, the process begins in block 202.

The introduction application software is installed in block 204 on the introducer's electronic device such as a smart phone. The electronic device is of a type having a central processor, a memory, and at least two modes of electronic communication. Once the introduction application has been installed as in block 204 (a one-time requirement) the introduction application is opened and executed. When opened, the introducer can view, such as represented in FIG. 1, previous introductions 112, 114, 116 of individuals and can be informed of an introduction 118 wherein the individuals are chatting.

Figure 2:
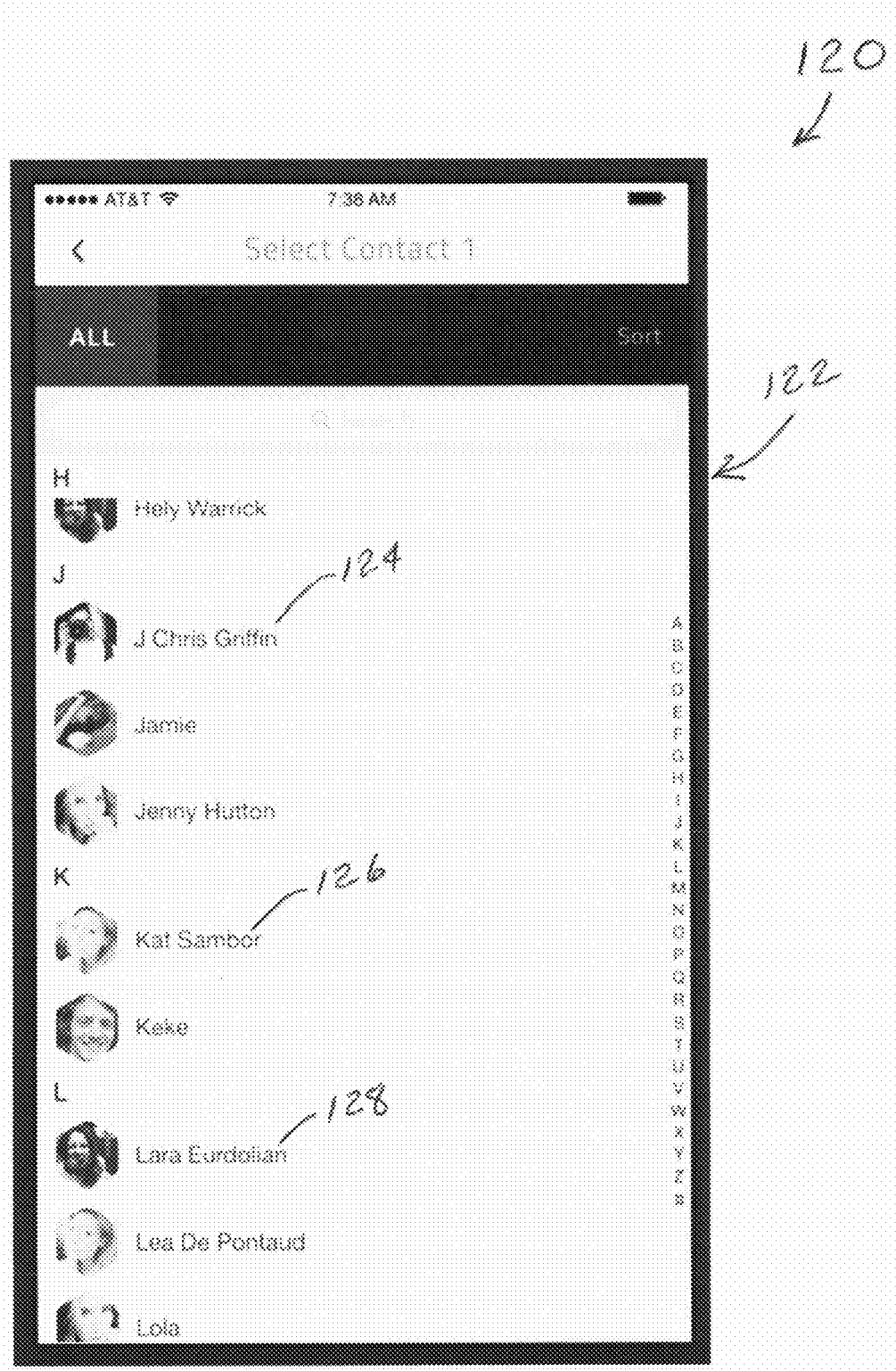
FIG. 2 presents a view of a second screen shot of the application showing a user's contact list.

In block 208 and as illustrated in the exemplary screenshot 120 of FIG. 2 a first contact list 122 is accessed in block 208 wherein the introducer is presented with a list of names of his/her contacts 124, 126, 128. The contact list is typically associated with a social media site, an email list, a phone number contact list, etc. The introducer then selects in block 210 a first individual from the first contact list 122 as a first party to the intended introduction. In block 212 the introduction application determines a mode of communication associated with the first individual.

In block 214 a second contact list is accessed which can be of a different social media site, email list, phone number contact list, etc. or can be the same contact list 122 accessed in block 208. The introducer then selects in block 216 a second individual from the second contact list as a second party to the intended introduction, and in block 218 the introduction application determines a mode of communication associated with the second individual. If the individuals selected in blocks 210 and 216 subscribe to the same social media site, the selected mode can be that social media site, or if selected from different media contact lists, the selected modes can be dissimilar.

Figure 3:
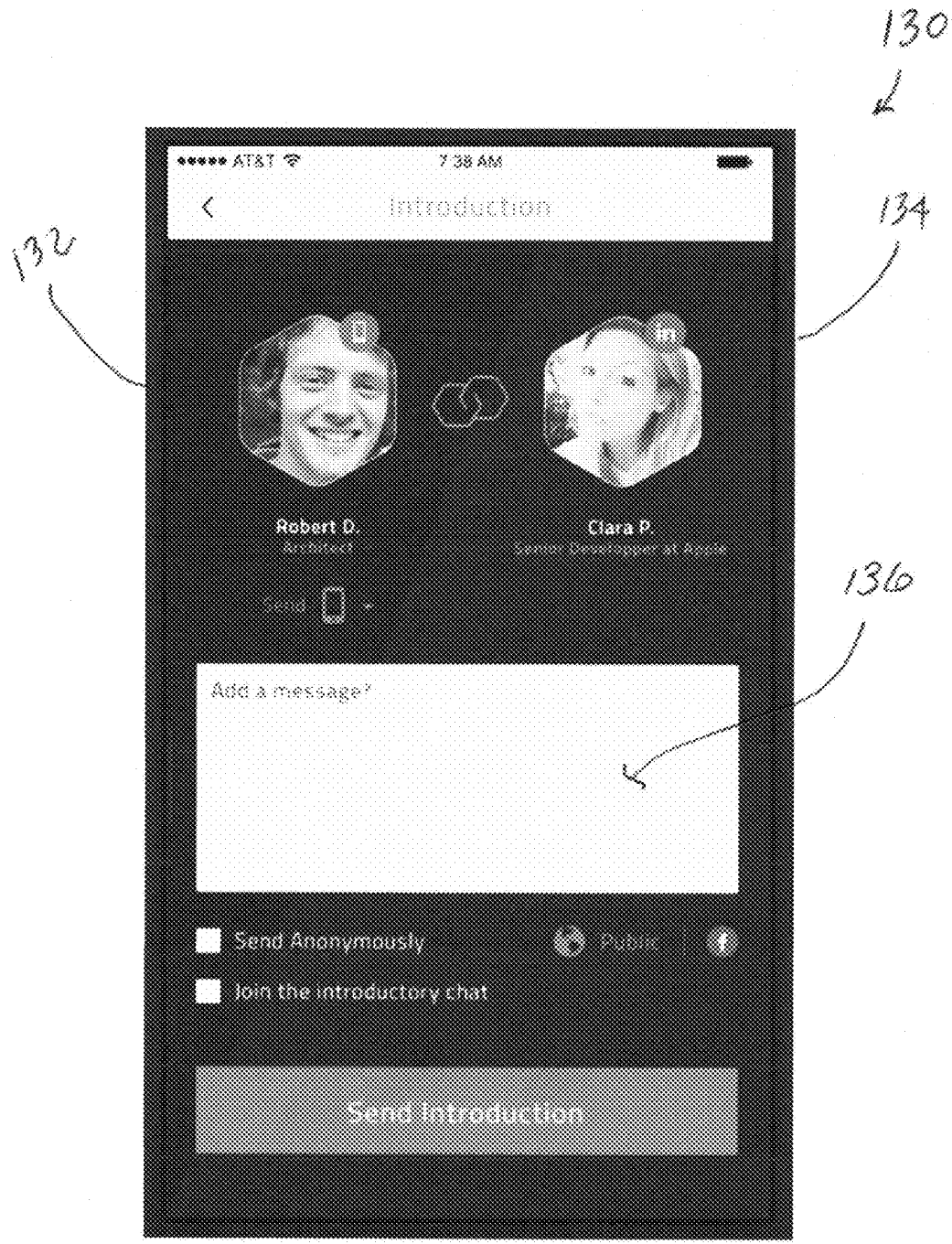
FIG. 3 presents a view of a third screen shot of the application showing a new introduction being made.

As illustrated in FIG. 3 a screen 130 can be presented illustrating the potential introduction of the first individual 132 to the second individual 134. The introducer can include a message in a message window 136 to be transmitted to the first and second individual 132, 134.

Figure 4:
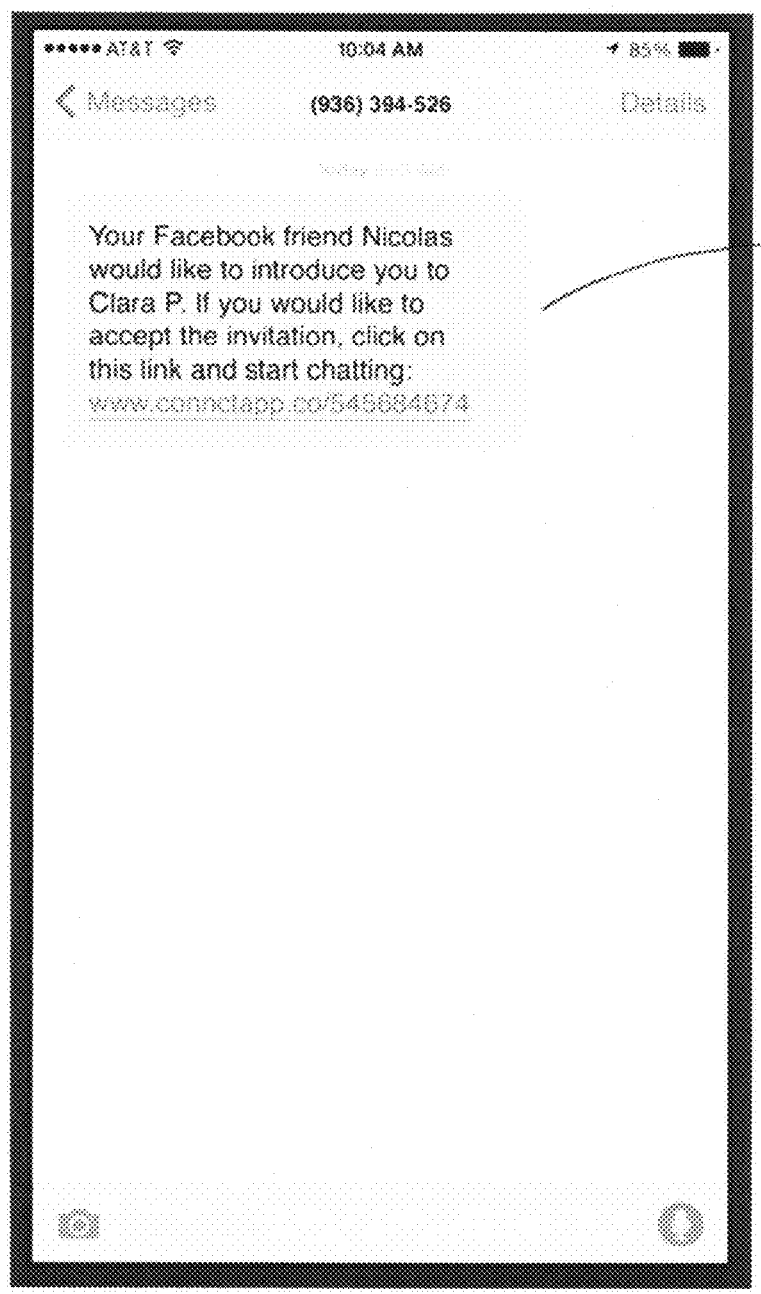
FIG. 4 presents a view of a fourth screen shot of the application showing a message presented to a first of the individuals being introduced wherein the first individual is invited to begin chatting.

Once the introducer has set up the desired introduction of the first individual to the second individual, the introduction is initiated by executing an invitation command in block 220 wherein an introduction invitation, such as invitation 142 in screen shot 140 of FIG. 4, is sent to and presented to the first individual, in block 222, and an invitation such as presented in screenshot 150, FIG. 5, is sent to and presented to the second individual in block 224.

The introducer can monitor the chat acceptance in block 226 such as introduction status notification 118 in FIG. 1. FIG. 6 illustrates a conversation between the first individual and the second individual wherein the chat messages of the first individual are converted to the chat message format of the second individual in block 228 by the introduction application software and relayed to the second individual in block 230. Likewise, the chat messages of the second individual are converted to the chat message format of the second individual and relayed to the second individual until the conversation ceases. The process then ends in block 232.

The above description is considered that of certain embodiments of the present invention only. Modifications of the invention will occur to those skilled in the art and to those who make or use the invention. Therefore it is understood that the embodiments described herein are merely for illustrative purposes only and are not intended to limit the scope of the invention hereof.

What is claimed is:

1. A method for electronically introducing a first individual to a second individual by an introducer, said method comprising the steps:

installing an introduction application on an electronic device of the introducer having a central processor, memory, and at least two modes of electronic communication;

executing the introduction application;

accessing at least one contact list resident on the introducer's electronic device;

selecting a first individual from a first accessed contact list;

determining a mode of communication for the first individual;
selecting a second individual from a second accessed contact list;
determining a mode of communication for the second individual;
executing on the introducer's electronic device an introduction command;
sending a chat invite to the first individual via the determined mode of communication for the first individual;
sending a chat invite to the second individual via the determined mode of communication for the second individual;
monitoring acceptance of the chat invitation by the first individual and by the second individual;
converting chat messages between the mode of communication for the first individual and the mode of communication for the second individual; and
relaying the converted messages between the first and the second individuals.

\* \* \* \* \*